(12) United States Patent
Schmid et al.

(10) Patent No.: US 6,969,986 B2
(45) Date of Patent: Nov. 29, 2005

(54) METHOD FOR DETERMINING A ROTATION SPEED AND A ROTATION DIRECTION OF A COMPONENT

(75) Inventors: Wolfgang Schmid, Langenargen (DE); Uwe Rühringer, Tettnang (DE); Gerold Kloos, Glēbe (AU)

(73) Assignee: ZF Friedrichshafen AG, Friedrichshafen (DE)

( * ) Notice: Subject to any disclaimer, the term of this patent is extended or adjusted under 35 U.S.C. 154(b) by 22 days.

(21) Appl. No.: 10/773,655

(22) Filed: Feb. 6, 2004

(65) Prior Publication Data
US 2004/0189282 A1   Sep. 30, 2004

(30) Foreign Application Priority Data
Mar. 28, 2003   (DE) ................. 103 14 064

(51) Int. Cl.[7] .............. G01P 13/04; G01B 7/30
(52) U.S. Cl. ................... 324/166; 324/207.25
(58) Field of Search .............. 324/161, 163, 324/165–167, 207.2–207.23, 207.25; 73/514.16, 73/514.31

(56) References Cited

U.S. PATENT DOCUMENTS

| | | | |
|---|---|---|---|
| 4,370,614 A | 1/1983 | Kawada et al. | 324/173 |
| 6,242,904 B1 | 6/2001 | Shirai et al. | 324/165 |
| 6,498,474 B1 | 12/2002 | Turner | 324/165 |

FOREIGN PATENT DOCUMENTS

| | | | | |
|---|---|---|---|---|
| DE | 195 15 338 A1 | 10/1996 | ........... | G01P 3/487 |
| DE | 198 38 433 A1 | 3/1999 | ........... | G01P 3/481 |
| DE | 102 28 744 A1 | 1/2003 | ........... | G01P 3/487 |
| JP | 06-273437 | 9/1994 | ........... | G01P 13/04 |

*Primary Examiner*—Bot LeDynh
(74) *Attorney, Agent, or Firm*—Davis & Bujold, P.L.L.C.

(57) ABSTRACT

A method is described for determining a rotation speed and a rotation direction of a component (2), in particular a transmission output shaft, with a sensor device (1). In the sensor device (1), as a function of a rotation speed and direction of the component (2), a first sensor signal and a second sensor signal are generated, which are phase shifted relative to one another and each of which, on reaching an upper switching threshold or a lower switching threshold in the sensor device (1), triggers a switching signal. When there are alternating, consecutive switching signals of the two sensor signals, the sensor device (1) emits a pulse signal as a function of which a variation of a sensor signal is generated, which is used to determine a rotation speed of the component (2). After a rotation direction reversal of the component (2) a pulse signal of the sensor device (1) is only generated after sensing a rotation movement of the component (2), this rotation movement of the component (2) being sensed when, in alternation, a switching signal of one sensor signal is followed by a switching signal of the other sensor signal.

16 Claims, 9 Drawing Sheets

METHOD FOR DETERMINING A ROTATION SPEED AND A ROTATION DIRECTION OF A COMPONENT

This application claims priority from German Application serial No. 103 14 064.6 filed Mar. 28, 2003.

FIELD OF THE INVENTION

The invention concerns a method for determining the rotation speed and rotation direction of a component.

BACKGROUND OF THE INVENTION

From DE 195 15 338 A1 a rotation speed sensor is known, which comprises a magnet and, cooperating with it, two Hall elements arranged a lateral distance apart, past which a component made of a ferromagnetic material and having an irregular circumference or a circumference with discontinuities can be moved in the direction of the lateral separation. With the aid of this rotation speed sensor, a speed of the component during it rotation or, if the component is at rest, a particular position of the component relative to the speed sensor can be determined. This information can be converted into a corresponding signal, which can be processed further by appropriate electronic equipment.

Such speed sensors, which are also used in industry, measure magnetic flux density changes produced by a rotating component or so-termed "signal wheel". From these flux density changes, the two Hall elements each produce a continuous sensor signal, whose wave-shaped variation depends on the distance between the speed sensor or a sensor device comprising the Hall elements, and the said signal wheel.

If the sensor signals exceed predetermined switching thresholds, respective alternating switching signals are sent to the sensor device which, in turn, emits a pulse signal to an evaluation unit which is evaluated in order to calculate a speed of the component or signal wheel electronically.

Owing to production-related running of the signal wheel out of true so that it deviates from an ideal condition, and owing to distance differences during a rotation of the signal wheel and while it is at rest, arrangements with a sensor device and a signal wheel are characterized by large dynamic and static air-gap ranges and, therefore, require sensors with a wide measurement range which can determine an operating condition of the signal wheel with high sensitivity, i.e., even with sensor signals of small amplitude and at the same time low switching thresholds of the sensor device.

The desired high sensitivity of sensor devices, however, especially when there are vibrations of the signal wheel caused for example at rest by rotation oscillations of the signal wheel, leads disadvantageously to the calculation of a rotation speed of the signal wheel, since pulse signals are emitted by the sensor device even though the signal wheel is not physically rotating. To increase insensitivity to vibrations, sensor devices with lower sensitivity are used, i.e., ones with higher switching thresholds, but these have the disadvantage of a smaller working range.

Thus, the above-mentioned requirements for the largest possible working or measurement range of the sensor devices, at the same time with high sensitivity for the determination of an operating condition of a signal wheel, represent conflicting demands since the insensitivity of a sensor device to vibrations is less good if its working range is larger, or the working range of a sensor device is smaller if at the same time, its insensitivity to vibrations is improved.

Accordingly, the purpose of the present invention is to provide a method for determining the rotation speed and rotation direction of a component with a sensor device with which the rotation speed and direction of the component can be determined over large working ranges even in the presence of substantial vibrations.

SUMMARY OF THE INVENTION

According to the invention, with the method for determining a rotation speed and direction of a component, in particular, a transmission output shaft, the rotation speed and direction of the component can be determined advantageously by means of a sensor device known in its own right from the prior art, over a large working range and with high insensitivity to vibrations.

This is achieved in that a pulse signal of the sensor device is generated when a reversal of the component's rotation direction has been sensed, only after a lasting rotation movement of the component in one direction, and a lasting rotation movement of the component is only recognized when, respectively in alternation, a switching signal of one sensor signal and a subsequent switching signal of the other sensor signal occur.

This means that when the component is at rest, rotational oscillations of it do not lead to the output of a pulse signal and so to the calculation of a component rotation speed. In this context, the number of alternating, consecutive switching signals of the two sensor signals can be specified in advance as a function of the application in each case, such that even rotational oscillations through large rotation angles which, in turn, generate several alternating consecutive switching signals of the two sensor signals, are not recognized as a rotation movement. Thus, in this case too no rotation speed of the component is determined.

BRIEF DESCRIPTION OF THE DRAWINGS

The invention will now be described, by way of example, with reference to the accompanying drawings in which.

DETAILED DESCRIPTION OF THE INVENTION

Figure 1:
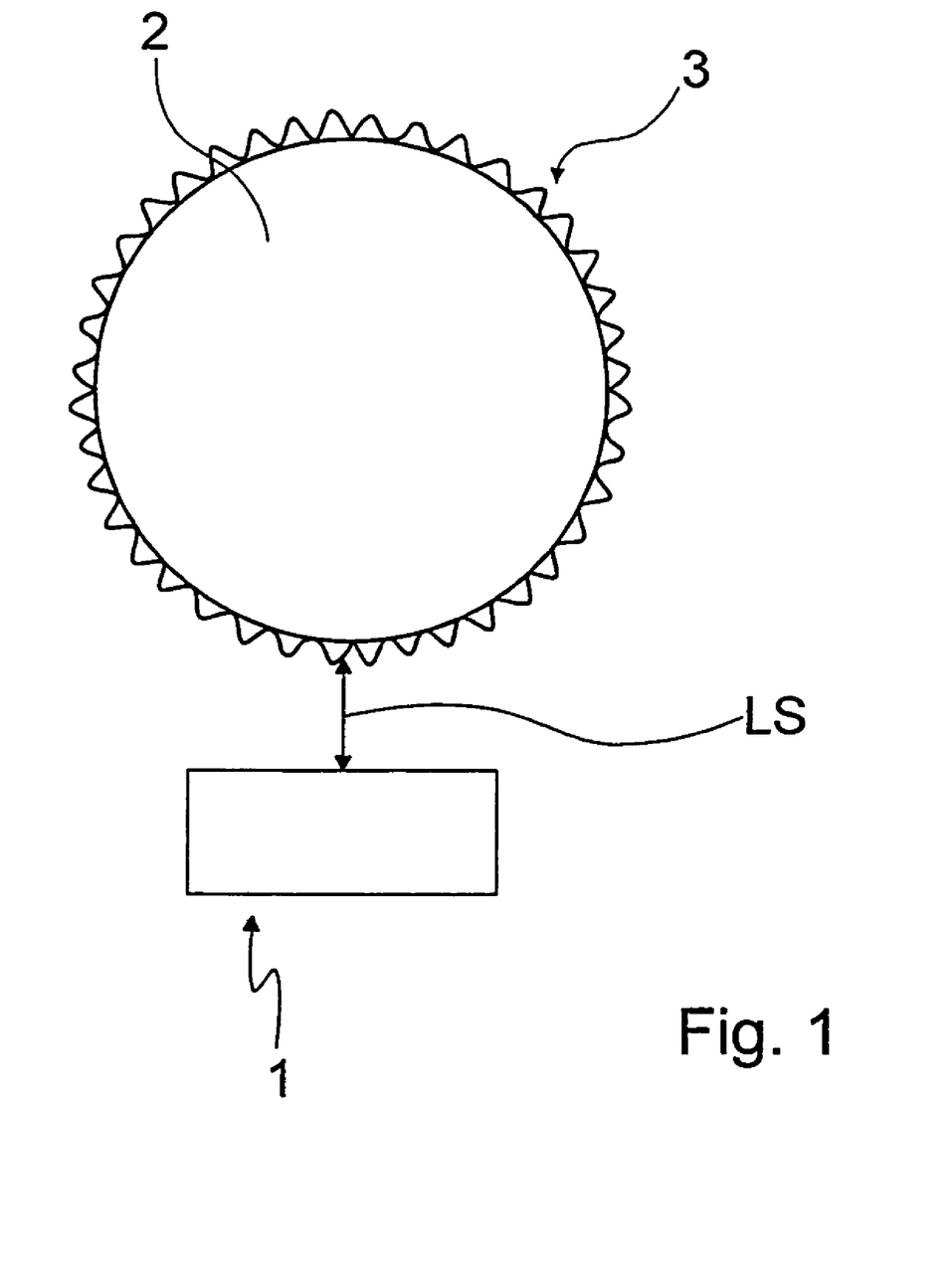
FIG. 1 is a schematic representation of an arrangement of a sensor device and a signal wheel corresponding thereto.

Referring to FIG. 1 a sensor device 1 for determining the rotation speed and direction of a rotary component (e.g., signal wheel) 2 is shown, which is arranged a certain distance LS from the component 2. The distance between the component 2 and the sensor device 1 is denoted here as the air gap LS, and during operation this varies dynamically due to manufacturing inaccuracies, for example, out-of-roundness of the component 2.

The rotating component constitutes a signal wheel 2 of a transmission output shaft of a transmission (not shown in greater detail) and is formed with a toothed profile 3 at its circumference, so that the circumferential surface of the signal wheel 2 facing the sensor device is wave-shaped.

In the present case, the sensor device 1 is made as a combined rotation speed and rotation direction sensor based on the Hall effect, which has two Hall elements arranged one after the other in the rotation direction of the signal wheel 2. When the signal wheel rotates, two sensor signals with a phase shift relative to one another are produced by the Hall elements or Hall ICs, each of which creates a flux density change DB at the Hall elements owing to the at least approximately periodically varying distance during a movement of the signal wheel, between the surface of the signal wheel 2 or toothed profile 3 facing the sensor device 1, and the sensor device 1, itself.

Figure 2:
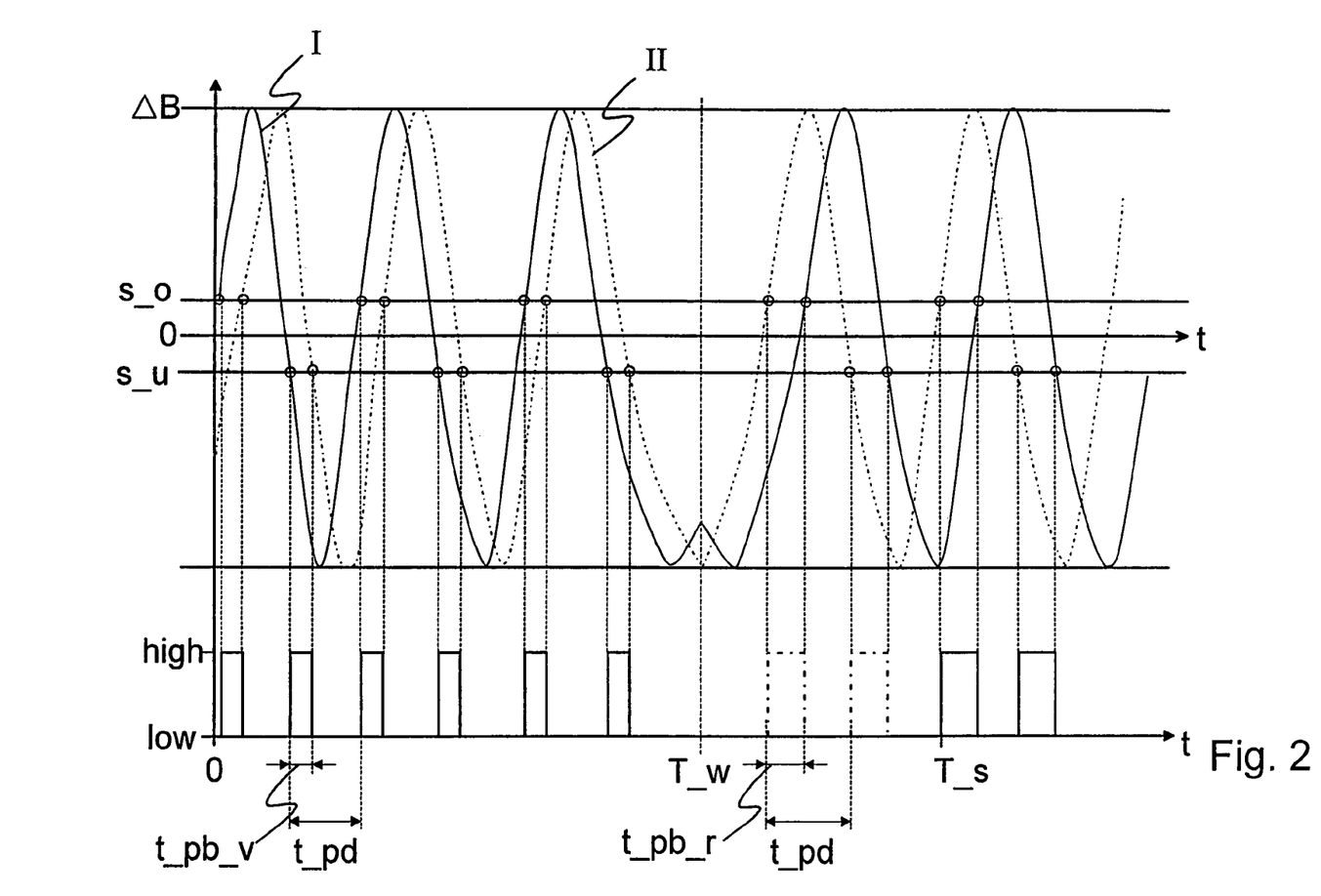
FIG. 2 is a graphic illustration of two at least approximately sinusoidal sensor signals of the sensor device according to FIG. 1, with a corresponding rectangular variation of a sensor output signal produced by pulse signals generated by the sensor device and used to calculate and determine the rotation direction of a rotation speed of the signal wheel.

The continuous sensor signals I, II produced by the sensor device are represented graphically in FIG. 2 as at least approximately sinusoidal curves with a phase shift of about p/2. FIG. 2 also shows an upper switching threshold or switching limit s_o and a lower switching threshold or switching limit s_u.

The upper switching limit s_o and the lower switching limit s_u are usable values which can be adapted during operation of the transmission. If one of the sensor signals exceeds the upper switching limit s_o or if one of the sensor signals I or II falls below the lower switching limit s_u, a switching signal is triggered in the sensor device 1. When alternating consecutive switching signals are triggered by the two sensor signals, in each case a pulse signal is emitted by the sensor device. These pulse signals generate a rectangular variation of a sensor output signal of the sensor device 1, with reference to which a rotation speed and direction of the signal wheel 2 is computed by an electronic transmission control (ETC) device (not shown).

A pulse width t_pb of the rectangles of the variation of the sensor output signal from the sensor device 1 varies as a function of the rotation speed of the signal wheel, the said width decreasing as the speed increases and increasing as the speed decreases.

The switching points of the two sensor signals I, II are each characterized by circles at the points of intersection between the sensor signals I, II and the upper switching limit s_o, or between the sensor signals I, II and the lower switching limit s_u. At these time points, at each of which a pulse signal is generated by the sensor device 1, a value of the variation of the sensor signal in FIG. 2 is switched from "low" to "high" or from "high" to "low", until a further pulse signal is generated by the sensor device 1.

Figure 3:
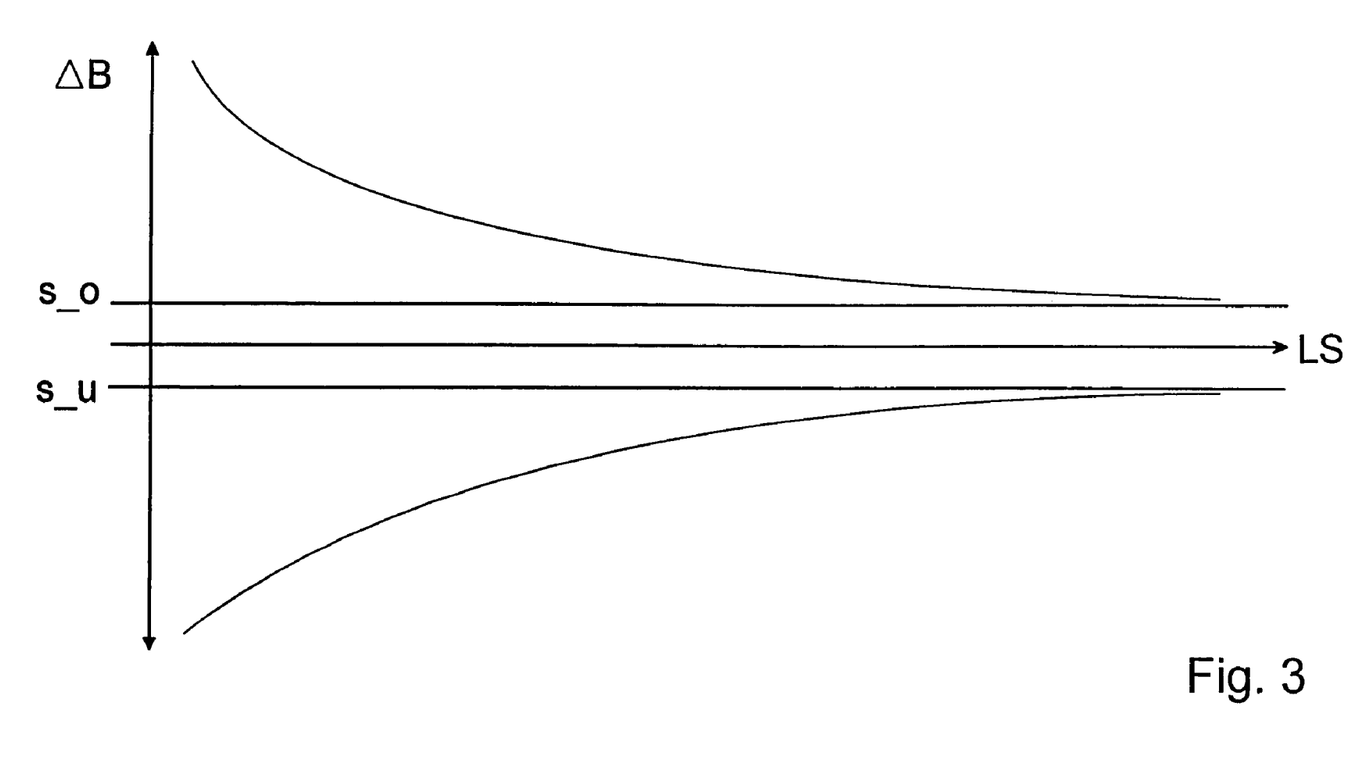
FIG. 3 is a representation of the relationship between the amplitude of the sensor signals of the sensor device and the distance between the sensed area of the signal wheel and the sensor device.

FIG. 3 shows the dependence of the amplitude of the sensor signals I, II on the distance between the signal wheel 2 and the sensor device 1. This variation shows that the amplitude, which is a time variation of the flux density DB of the sensor device 1, decreases steadily with increasing air gap LS.

The upper switching limit s_o and the lower switching limit s_u must be chosen such that the amplitudes of the sensor signals are quantitatively definitely larger than the two switching thresholds s_o and s_u, since otherwise no switching signals will be generated in the sensor device. If the upper and lower switching limits s_o and s_u are chosen too large, in certain operating situations this can prevent the sensor signals from any longer exceeding or falling below the switching limits s_o and s_u, respectively. The sensor device 1 then generates no further pulse signals and it is no longer possible to determine a rotation speed and direction even though the signal wheel 2 is rotating.

To avoid such situations, a maximum air gap range is first determined for an arrangement between a signal wheel and a sensor device, this range being limited by a minimum air gap and a maximum air gap. The differences between the minimum and maximum air gap are caused among other things by out-of-roundness of the signal wheel 2, poor mounting of the signal wheel 2 on the transmission output shaft, wear or aging, and manufacturing inaccuracies for each gear individually, and must therefore preferably be determined empirically or by the usual tolerance calculations.

With knowledge of the maximum air gap range, in combination with the known dependence of the sensor signal amplitude on the air gap the switching thresholds s_o and s_u are set so as to ensure rotation speed and direction recognition throughout the complete operating range of the transmission. Once established, the switching thresholds can for example be adapted during operation to varying maximum air gap ranges by means of suitable adaptation routines, so that rotation speed and direction recognition is permanently and reliably ensured.

Figure 4:
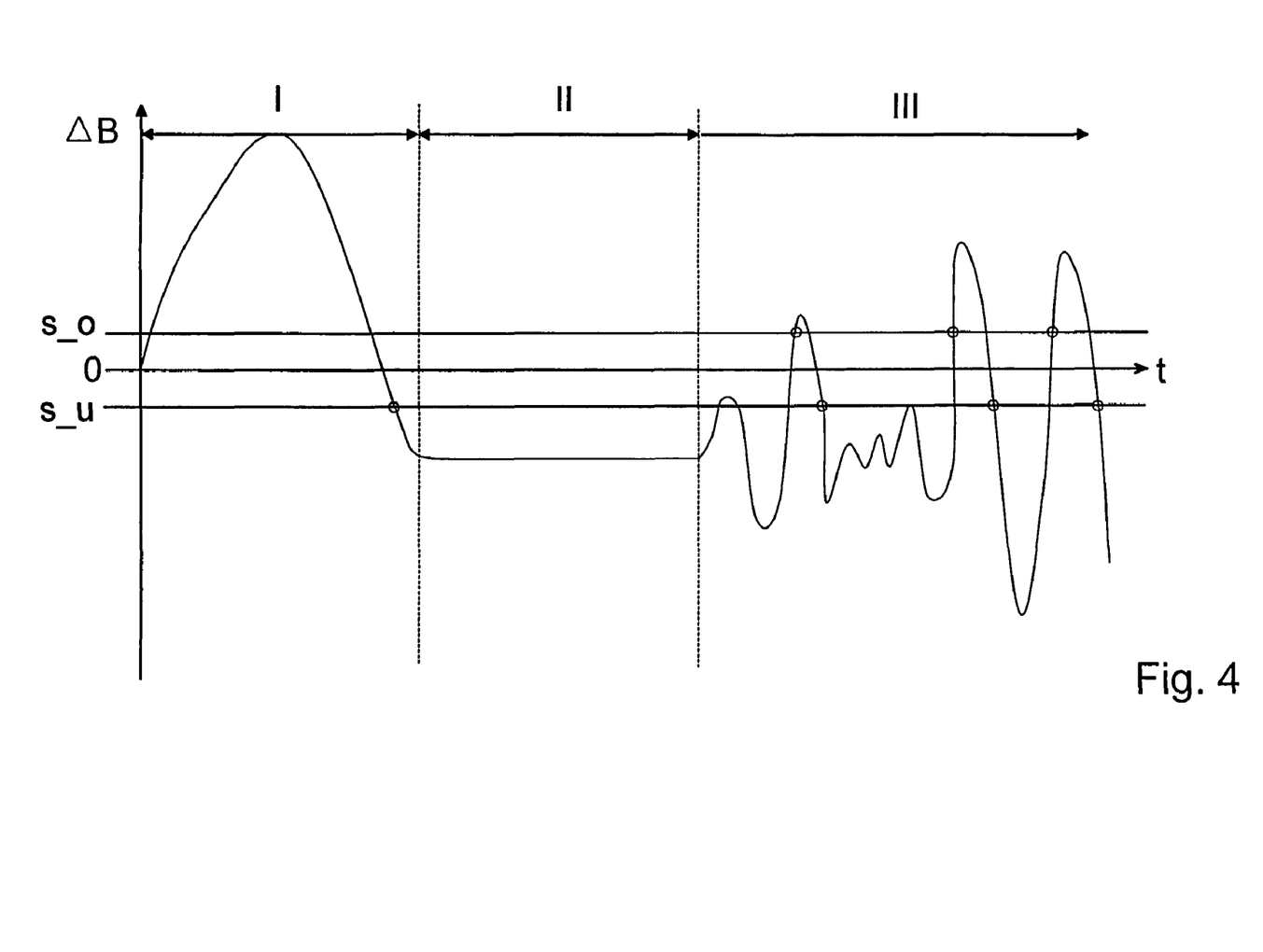
FIG. 4 is a time variation of a sensor signal of the sensor device taken in isolation during various operating conditions of the signal wheel.

FIG. 4 shows the variation of one of the sensor signals over time during various operating conditions of the signal wheel 2, each of the points of intersection circled in FIG. 4 between the sensor signal and the switching thresholds s_o and s_u triggering switching signals in the sensor device.

During a first phase I in which the signal wheel 2 is rotating in one direction, the sensor signal varies sinusoidally as shown in FIG. 2. During a subsequent second phase II the signal wheel 2 is at rest and throughout the second phase II the sensor signal remains constant at the value it had at the moment when the signal wheel 2 came to rest. In FIG. 4 the moment of stopping marks the transition between the first phase I and the second phase II.

During a third phase III the signal wheel is again at rest, but owing to oscillations in a drive train of a motor vehicle in which the gearwheel is integrated, the motionlessness of the signal wheel 2 is disturbed by vibrations and rotational oscillations. In contrast to its behavior during the second phase II, the variation of the sensor signal is irregular, sometimes exceeding the upper switching threshold s_o and sometimes falling below the lower switching threshold s_u.

Rotational oscillations when the signal wheel 2 is nominally at rest are characterized by the triggering of sensor signals in the sensor device, whose variation swings with a certain regularity and amplitude about a zero position, i.e. the rest position of the signal wheel, with respect to which a rotation reversal is determined periodically which is of smaller amplitude than when the signal wheel is turning in a consistent rotation direction.

In the method for determining a rotation speed and direction of a component according to the invention, as shown in idealized form in FIG. 2, a pulse signal is emitted whenever a switching signal of one sensor signal alternates with a switching signal of the other sensor signal.

Moreover, with the method according to the invention a rotation direction reversal is determined when a sensor signal triggers two consecutive switching signals, without a switching signal of the other sensor signal occurring between them. In this case no pulse signal is generated by the sensor device 1. Such an event, together with the switching signals of the one sensor signal, leads to the recognition of a rotation direction reversal.

Once a rotation direction reversal has been detected, the sensor device 1 will only emit a pulse signal again when a switching signal of one sensor signal follows a switching signal of the other sensor signal, since only then is a lasting rotation of the signal wheel in a particular direction recognized.

If there occur particularly large rotation oscillations, which for example lead to the output of several alternating, consecutive switching signals for the two sensor signals, in an advantageous embodiment of the method according to the invention it can be provided that a pulse signal is only emitted by the sensor device when three or even more alternating, consecutive switching signals have been triggered by the two sensor signals.

This process is illustrated in FIG. 2 by the two rectangular pulses of the variation of the sensor output signal drawn using dot-dash lines. The two dot-dash rectangles are not used in the ETC device for rotation speed and direction determination. The rectangle drawn with a continuous line, produced at a time $T\_s$ by the switching signal of sensor signal II, is used in the ETC device for determining the rotation speed and direction.

If the generation of pulse signals by the sensor device 1 after a recognized rotation direction reversal is stopped and the output of the pulse signals takes place already after a switching signal of one sensor signal and a subsequent switching signal of the second sensor signal, vibrations of the signal wheel in the range of signal wheel rotation angles larger than or equal to p/2 are suppressed, which in relation to the signal wheel 2 corresponds to about a quarter of the distance between two teeth of the toothed profile 3.

If, once a rotation direction reversal has been recognized, pulse signals are not emitted until several alternating consecutive switching signals of the two sensor signals have been triggered, vibrations of the signal wheel in the range of a rotation angle larger than or equal to n times p/2 are suppressed, which in relation to the signal wheel corresponds to about n times a quarter of the tooth spacing.

In this, the variable n is the number of alternating consecutive switching signals of the two sensor signals. By an appropriate choice of the parameter n, i.e., the number of switching signals to be awaited, which are produced alternatively and consecutively by the two sensor signals, a so-termed suppression hysteresis of the sensor device 1 can be established in a suitable manner.

Figure 5:
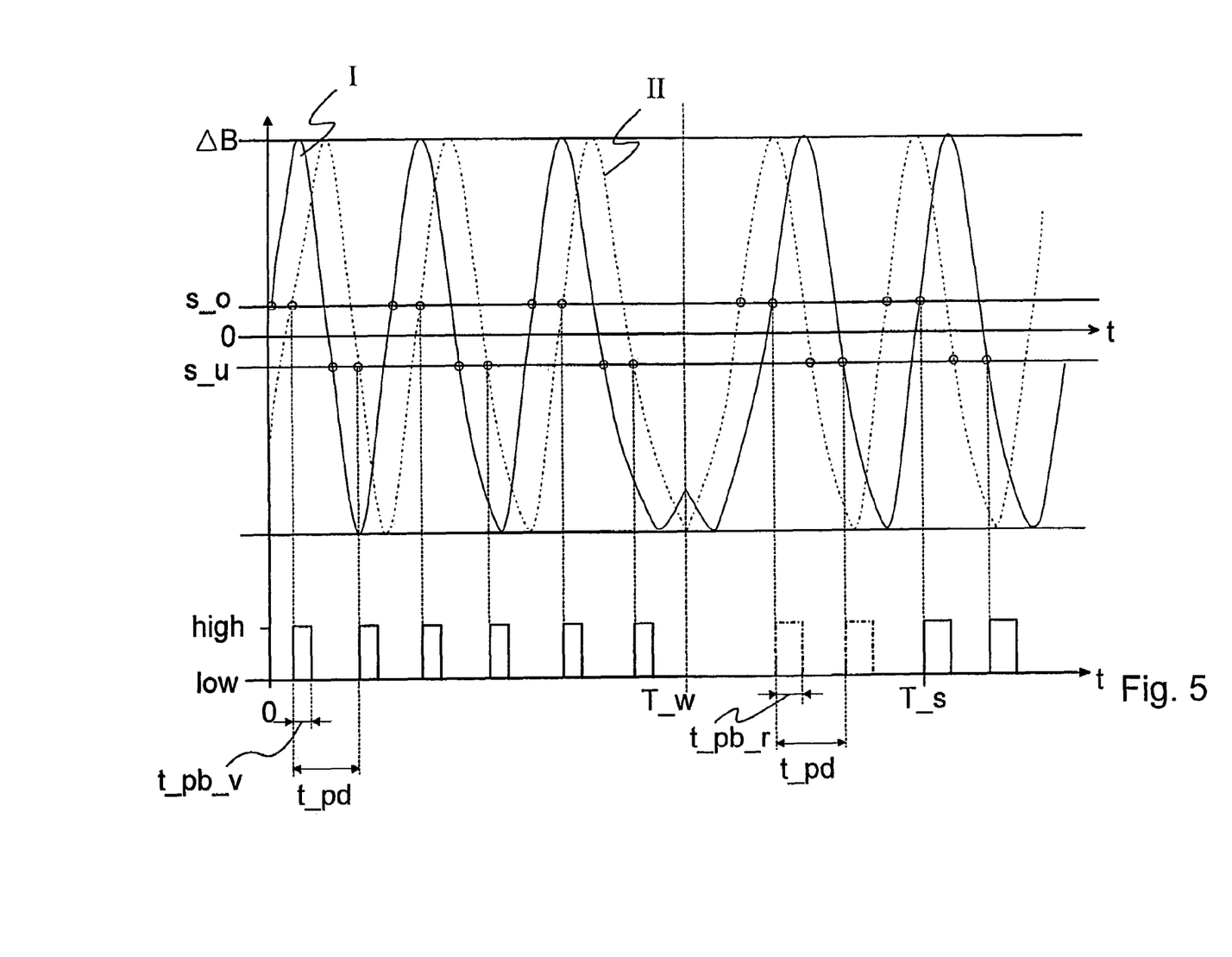
FIG. 5 are sensor signals according to FIG. 2 and a variation of the sensor output signal differing from FIG. 2.

Referring to FIG. 5, the variations of the two sensor signals I, II of the sensor device 1 according to FIG. 2 with a rectangular shape of the sensor output signal are shown, such that a pulse width $t\_pb\_v$ or $t\_pb\_r$ of the sensor output signal according to FIG. 5 varies as a function of the rotation direction of the component 2, and such that in each case the pulse width $t\_pb$ corresponds to the width of a rectangle of the rectangular variation of the sensor output signal.

A time $T\_w$ corresponds to the moment when the rotation direction of the component 2 changes, so that the phase shift between the two sensor signals I, II is modified in such manner that the first sensor signal I represented by a continuous line, which before the change of the rotation direction of the component 2 always produced a switching signal timed in advance relative to the switching signal generated by the second sensor signal II represented by a broken line, now always produces a switching signal retarded relative to the second sensor signal II represented by the broken line.

The rectangular shape of the sensor output signal is produced because whenever a switching signal of the second sensor signal II represented by the broken line occurs, the position of the sensor output signal is switched from "low" to "high", and after the lapse of a predefined time $t\_pb\_v$, it is again restored from "high" to "low", the predefined time $t\_pb\_v$ corresponding to the pulse width and in the present case being independent of rotation speed, but varying as a function of the rotation direction of the component 2.

When the rotation direction of the component 2 has changed, i.e., after the time $T\_w$, the sensor device 1 emits a switching signal as a function of the first sensor signal I, which again switches the position of the sensor output signal from "low" to "high". Since the switching signal of the first sensor signal I is preceded by a switching signal of the second sensor signal II, a rotation direction reversal is recognized and after the lapse of a time $t\_pb\_r$ the position of the sensor output signal is restored from "high" to "low". The rectangular pulse after the reversal time-point $T\_w$ is emitted at the moment when the first sensor signal I exceeds the upper switching threshold $s\_o$. The second rectangular signal of the sensor output signal variation is generated at the time-point when the first sensor signal I falls below the lower switching threshold $s\_u$ for the first time after the reversal time $T\_w$. At that moment the position of the sensor output signal is switched from "low" to "high" and, after the lapse of a time $t\_pb\_r$, it is restored from "high" to "low".

In FIG. 5 the two rectangular pulses of the sensor output signal variation, which directly follow the reversal moment $T\_w$, are drawn using dot-dash lines. This is intended to indicate that although the two rectangular pulses of the sensor output signal are indeed generated by the sensor device 1, they are not used in the electronic transmission control device for determining the rotation speed and for recognizing the rotation direction.

This is the point at which the method according to the invention, which in terms of software is implemented in the electronic transmission control device, comes into its own. Recognition of the rotation speed and determination of the rotation direction of the component 2 do not take place until the time-point $T\_s$, when the first sensor signal I exceeds the upper switching threshold $s\_o$ for the second time after the rotation direction reversal of the component 2 at time $T\_w$. This means that only the third rectangular pulse after the reversal moment $T\_w$ is used in the electronic transmission control device for rotation speed and direction recognition.

This ensures that any switching signals of the sensor signals I and II possibly produced because of the rotation oscillations of the component or signal wheel 2 described earlier, do not lead to a rotation speed and direction recognition in the electronic transmission control device, which could trigger certain control functions for a transmission that are not required when a vehicle is stationary and might therefore compromise the operation of the transmission.

After a rotation direction reversal of the component 2, the pulse width $t\_pb$ of the rectangular pulse of the sensor output signal variation will have the predefined value t_pb_r, which is different from the predefined value t_pb_v and which also does not vary as a function of the rotation speed of the signal wheel 2.

In the present case a period duration t_pd corresponds to the time between the switching signals of the sensor signals I and II which, respectively, generate a rectangular pulse of the sensor output signal variation. Since the times of the switching signals of the sensor signals I and II vary as a function of the rotation speed of the component 2, the duration t_pd also varies as a function of the rotation speed of the component 2. In this case a pulse height of the sensor output signal variation also corresponds to a predefined value resulting from the difference between the "high" and "low" values and which, in the example embodiment of FIG. 5, is a constant value independent of the rotation direction.

Figure 6:
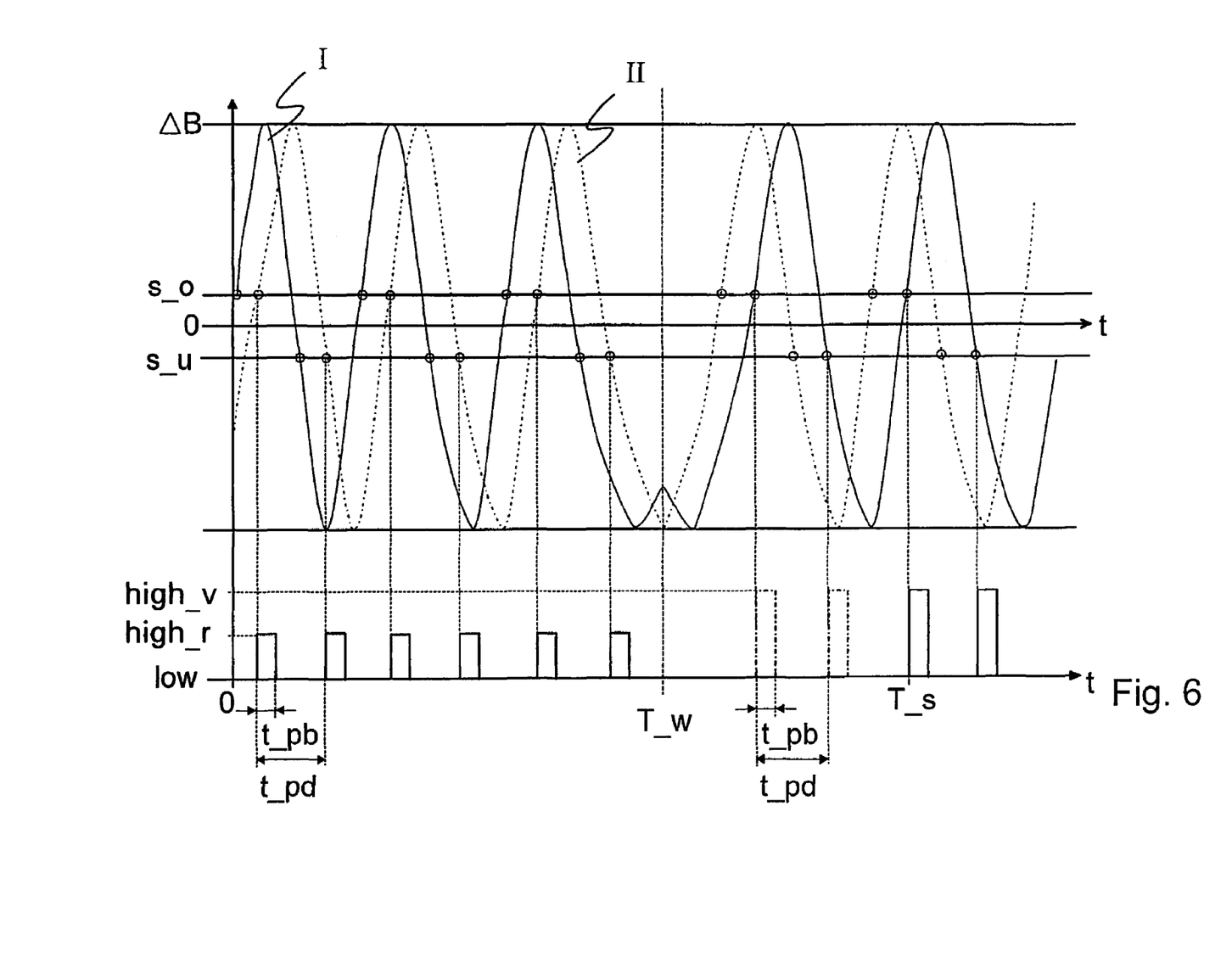
FIG. 6 are sensor signals as in FIG. 2 and a sensor output signal variation corresponding thereto, in which a pulse height varies as a function of the rotation direction of the component.

FIG. 6 shows variations of the sensor signals I and II according to FIGS. 2 and 5, which respectively bring about a variation of the sensor output signal corresponding in each case to different behavior as described below.

The pulse width t_pb of the rectangular variation of the sensor output signal in FIG. 6 is predetermined and depends neither on the speed nor on the direction of rotation, and as in the embodiment according to FIG. 5, the period duration t_pd varies as a function of the rotation speed of the component 2.

This means that the rectangular pulses of the sensor output signal variation of the sensor device 1 have the same pulse width t_pb regardless of the rotation direction of the component 2. In contrast, the pulse height of the rectangular pulses varies depending on the rotation direction of the component 2, between the values "low" and "high_r" or "high_v".

The two rectangular pulses of the sensor output signal that come after the reversal moment T_w are again drawn with dot-dash lines as in FIG. 5, since although these two rectangular pulses are produced by the sensor device 1, they are not used in the ETC device for either rotation speed or rotation direction recognition. The first rectangular pulse used for rotation speed and direction recognition by the electronic transmission control device is that generated by the switching signal of the first sensor signal I at time T_s.

Figure 7:
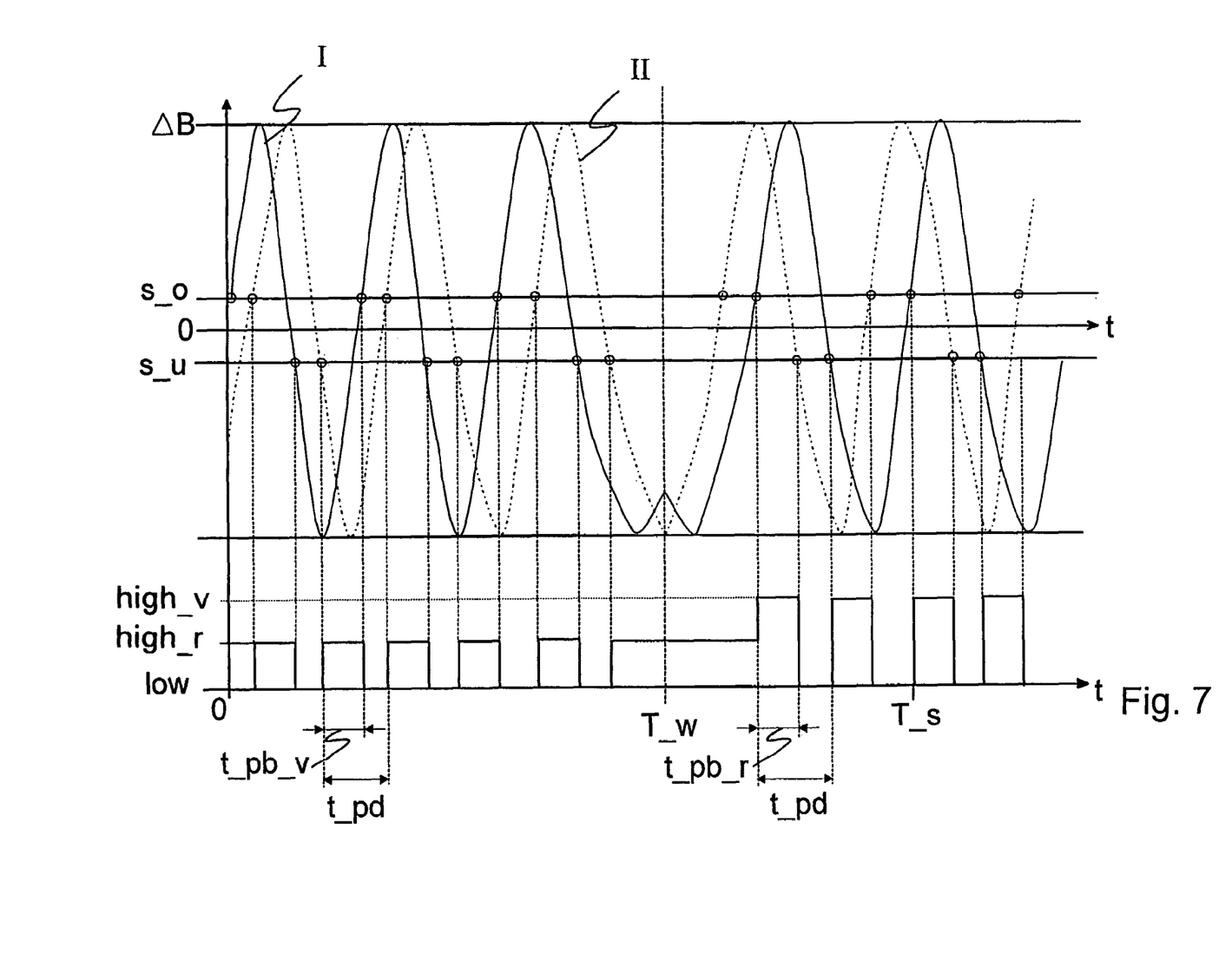
FIG. 7 are sensor signals according to FIG. 2 and another variation of the sensor output signal.
Figure 8:
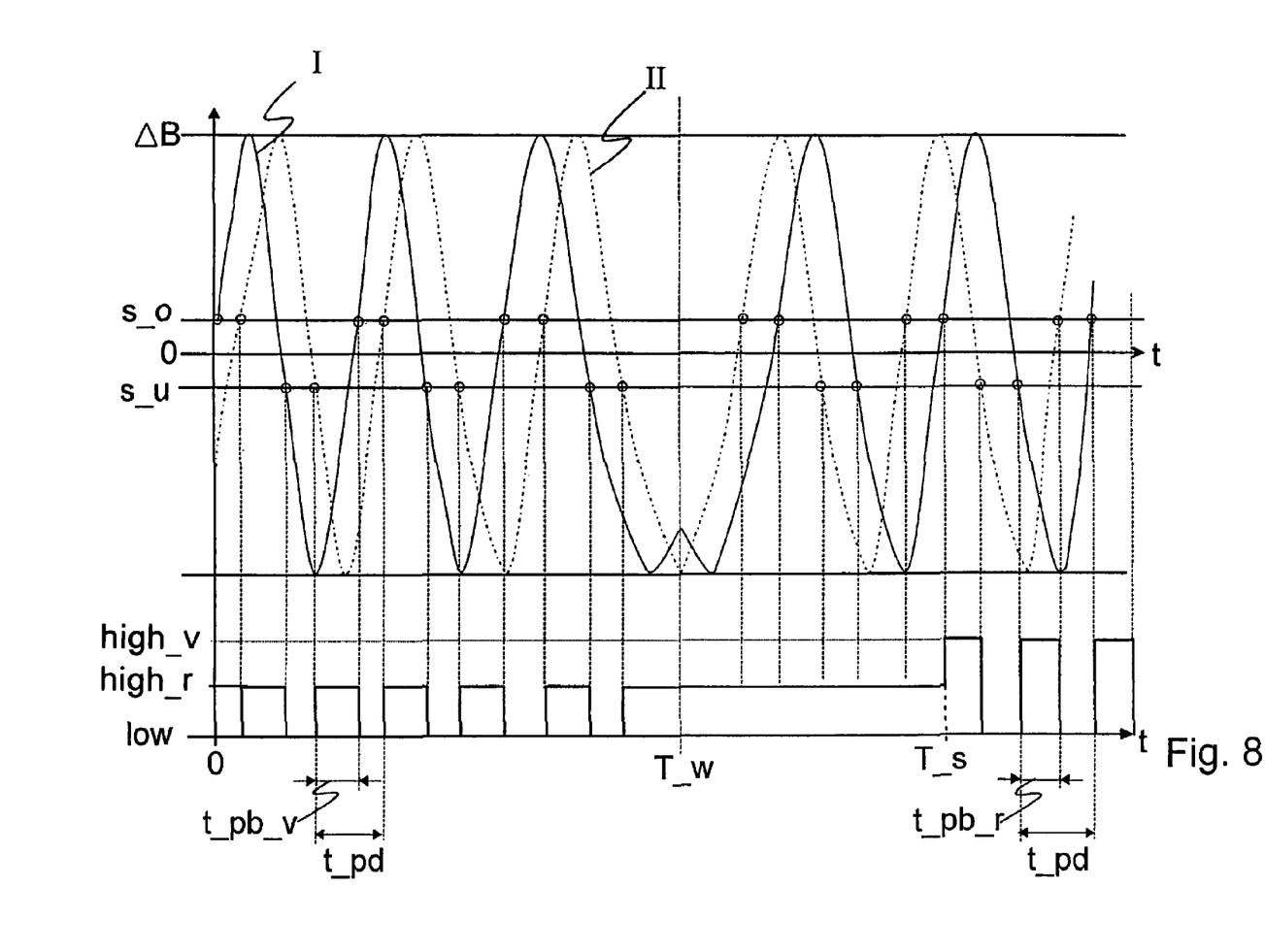
FIG. 8 are sensor signals according to FIG. 2 and a corresponding variation of a sensor output signal.
Figure 9:
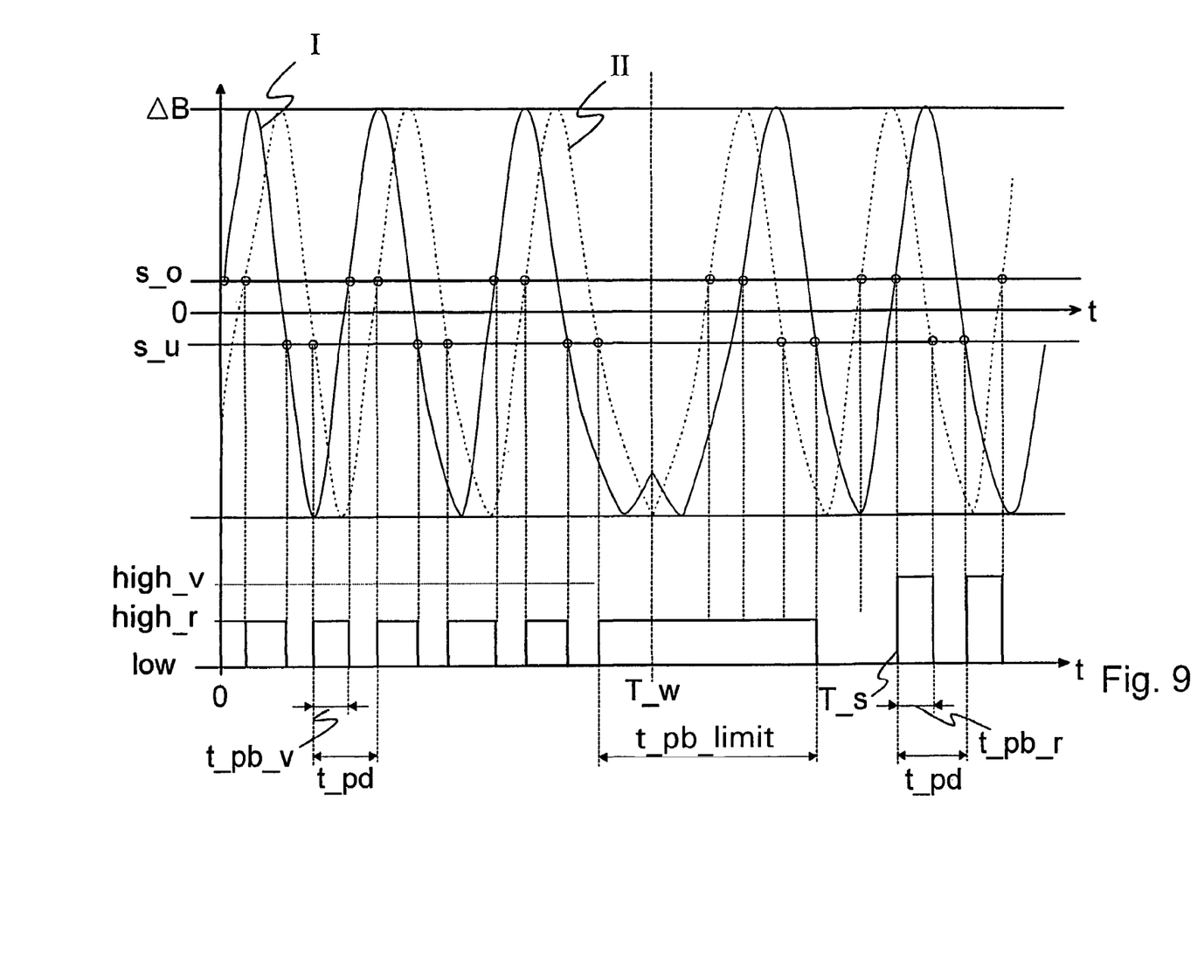
FIG. 9 are sensor signals of FIG. 2 and sensor output signal variation whose pulse width and period duration depend on the rotation speed.

FIGS. 7 to 9 show respective variations of the sensor signals I and II as in FIG. 2, in which the behavior of the pulse width t_pb and the pulse height of the rectangular pulses of the sensor output signal variation is different in each case.

In addition, the evaluation of the switching signals of the sensor signals I and II in the electronic transmission control device also varies, so that the respective rectangular variations of the sensor output signal shown in FIGS. 7 to 9 are produced.

Referring to FIG. 7, the pulse width t_pb is a function of the rotation speed of the component 2. This means that before the reversal time T_w a rectangular pulse is generated whenever there is a switching signal of the second sensor signal II and the pulse height of the sensor output signal is switched from "low" to "high_r". A switching signal of the first sensor signal I restores the sensor output signal from "high_r" back to "low". After the reversal moment T_w, the rectangular signals of the sensor signal variation are respectively switched from "low" to "high_v" at the switching times of the sensor signal I, and restored from "high_v" back to "low" at the switching times of the sensor signal II.

Since after the rotation direction reversal of the component 2 at the reversal time T_w the sensor device 1 does not trigger a switching signal of the first sensor signal I following the switching signal of the sensor signal II, the sensor output signal variation remains at the value "high_r" of the pulse height until the first switching signal of the first sensor signal I following the reversal time T_w, and at the first switching signal of the sensor signal I after the reversal time T_w, is increased to the value "high_v". Thereafter, at the next switching signal of the second sensor signal II, the rectangular pulse is switched to the "low" value of the pulse height of the sensor output signal variation.

In this case too, the first rectangular pulse used in the electronic transmission control device for rotation speed and direction recognition is that generated at time T_s.

The sensor output signal variation shown in FIG. 8 occurs when the pulse width t_pb and the period t_pd vary as a function of the speed of the component 2 and the pulse height varies as a function of the rotation direction of the component 2, between "low" and "high_r" and between "low" and the value "high_v".

In contrast to the method variant according to FIG. 7, the pulse height is not increased from "high_r" to "high_v" until time T_s which, as described earlier, is the time when the sensor output signal is for the first time again used in the electronic transmission control device for recognizing the rotation direction and speed. Between the reversal time T_w and time T_s the switching signals of the sensor signals I and II are ignored.

The sensor output signal variation shown in FIG. 9 occurs when the pulse width t_pb and the period duration t_pd both depend on rotation speed and the pulse height also varies as a function of the rotation direction. In contrast to the embodiment according to FIG. 8, a limit value t_pb_limit of the pulse width is stored in the sensor device 1 or alternatively in the electronic transmission control device, after the lapse of which the rectangular pulse is switched back from "high_r" to "low". Only at the time T_s when a switching signal of the sensor signal I is triggered, is a rectangular pulse with height "high_v" generated, which is used in the electronic transmission control device to recognize the rotation direction and speed.

Suppression of the use of the switching signals of the two sensor signals I and II after a recognized rotation direction reversal can be implemented both as a hardware or software solution in the sensor device 1, and as a software version in the electronic transmission control device.

When the evaluation suppression is implemented in the sensor device, after the recognition of a rotation direction change the sensor device does not emit any pulse signal until a predetermined value of the variable n has been reached, or a number of switching signals of the two sensor signals I and II has been produced after the moment of reversal T_w.

If the software solution for evaluation suppression is integrated in the electronic transmission control device and, respectively after a switching signal of the first sensor signal I and of the second sensor signal II, pulse signals are emitted by the sensor device, corresponding rectangular pulse of the sensor output signal are generated. However, in the electronic transmission control device the rectangular pulses are only used for rotation speed and direction recognition after the generation of the n-th such rectangular pulse.

In an extension of the object of the invention it is provided that with reference to a so-termed scan ratio corresponding to a quotient of the period duration t_pd and the pulse width t_pb, a plausibility test of the sensor output signal or the rotation direction of the component 2 determined from it is carried out. In this, a scan ratio larger than 0.5 indicates a "forward" rotation direction. If the scan ratio determined is smaller than 0.5, the component rotation direction is determined as "reverse".

This provides the possibility, in combination with a pulse height of the sensor output signal variation that depends on the rotation direction, to carry out a test whether the scan ratio agrees with the pulse height of the sensor input signal variation set at the time. If there are differences, defined fault routines can if necessary be initiated and/or a fault signal can be sent to a driver in any desired way.

The method according to the invention is particularly appropriate for sensor principles used for rotation speed and direction recognition and whose signal amplitudes depend on the distance or air gap between the signal wheel and the sensor device. These include for example the measurement systems based on the Hall principle described earlier, or even so-termed magneto-resistive measurement systems.

By means of the above-described evaluation, according to the invention, of two sensor signals from a sensor device known in its own right, which are used for the recognition of rotation speed and direction, maximum insensitivity to vibrations at the same time as the maximum possible working air gap are achieved.

In addition, isolated or even permanent air gap changes over the entire working air gap or the maximum air gap are permissible in any combination, thanks to which sensor devices according to the invention can also be used in systems which, to date, have not been able to be sensed or monitored with conventional sensor devices. Such systems are for example diesel engines with poor true-running properties, which give rise to very high vibrations.

The method according to the invention for determining a rotation speed and direction of a component, in combination with a known sensor device, provides a robust system for determining the rotation speeds and directions and enables the use of more compact sensor devices which satisfy strict demands in relation to insensitivity to vibrations while at the same time having a wide useful dynamic and static working air gap range.

Thanks to the above-described procedure according to the invention for determining a rotation speed and direction of a component, preferably less stringent manufacturing requirements are imposed on a signal wheel and its surroundings, so that so-termed selection expenditure for the selection of signal wheels and sensor devices can be reduced or avoided, thereby reducing production costs.

A rotation speed of the component or signal wheel 2 determined by the sensor device 1, which ultimately corresponds to a rotation speed of a transmission output shaft, can be used in a drive train of a vehicle in combination with an engine speed to control shift elements of the transmission.

Thanks to the now virtually error-free evaluation of the operating condition of the signal wheel, faulty control of the shift elements due to erroneous rotation speed information can be avoided, since for example when the transmission output shaft is at rest, a different closing or shift strategy is used to control the shift elements from that used at low or even high vehicle speeds, for example when the vehicle is rolling at 150 km/h.

Moreover, other control functions for a drive train of a vehicle, for example, for a turbine wheel of a hydrodynamic torque converter or even for a self-uncoupling function, can be controlled more exactly or without error as a function of the operating condition of the signal wheel determined by means of the method according to the invention, since a stoppage of the vehicle can be detected clearly.

Reference Numerals
1 Sensor device
2 Component (e.g., signal wheel)
3 Toothed profile
DB Flux density change
LS Air gap
low Pulse height
high Pulse height
high_v Rotation-direction-dependent pulse height
high_r Rotation-direction-dependent pulse height
s_o Upper switching limit
s_u Lower switching limit
t Time
t_pb Pulse width
t_pd Period duration
t_pb_v Rotation speed- or direction-dependent pulse width
t_pb_r Rotation speed- or direction-dependent pulse width
t_pb_limit Limit value of the pulse width
t_w Time point
t_s Time point
I, II Sensor signal

What is claimed is:

1. A method for determining a rotation speed and a rotation direction of a component (2) via a sensor device (1), the method comprising the steps of:
generating a first sensor signal (I) and a second sensor signal (II) as a function of a rotational speed and a rotational direction of the component (2), with the first and second sensor signals being phase shifted relative to one another;
triggering a switching signal in the sensor device (1) whenever the first and second sensor signals reach one of an upper switching threshold (s_o) or a lower switching threshold (s_u) such that when alternating and consecutive switching signals of the first and second sensor signals (I, II) are present, a pulse signal is generated as a function of consecutive first and second sensor signals (I, II) and used to determine a rotational speed of the component; and
only generating a pulse signal of the sensor device (1) after the component (2) reverses rotational direction with the rotation movement of the component (2) in the reverse direction being only recognized once a switching signal of one of the first and second sensor signals is consecutively followed by a switching signal of the other first and second sensor signals (II or I) which is then followed by a second switching signal of the one of the first end second sensor signals (I or II) which is then followed by a second switching signal of the other first and second sensor signals (II or I).

2. The method according to claim 1, further comprising the steps of determining a rotational direction reversal of the component (2) when two consecutive switching signals of one of the first and second sensor signals (I or II) occurs without any switching signal of the other of the second and first sensor signal (II or I) occurring between the two consecutive switching signals.

3. The method-according to claim 1, further comprising the steps of generating the first and second sensor signals (I, II) so as to have continuous, at least approximately sinusoidal variations.

4. The method according to claim 3, further comprising the steps of varying an amplitude of the sensor signals (I, II) as a function of a distance (LS) between the sensor device (1) and an area of the component (2) sensed by the sensor device (1).

5. The method according to claim 1, further comprising the steps of generating from the pulse signals a rectangular variation of the sensor output signal of the sensor device (1), such that a width of the rectangle corresponds to a pulse width (t_pb), a distance a between two switching signals of the first and second sensor signals (I, II) each generating a rectangular signal corresponds to a period duration (t_pd), and a height of the rectangles corresponds to a pulse height.

6. The method according to claim 5, further comprising the step of assigning a predefined value to the pulse width (t_pb).

7. The method according to claim 5, further comprising the step of assigning a respective predefined value (t_pb_v, t_pb_r) to the pulse width (t_pb) for each of the two rotational directions of the component (2).

8. The method according to claim 5, further comprising the step of varying the pulse width (t_pb) as a function of the rotational speed of the component (2).

9. The method according to claim 5, further comprising the step of varying the period duration (t_pd) as a function of a rotational speed of the component (2).

10. The method according to claim 5, further comprising the step of respectively assigning to the pulse height a predefined value (low, high_v, high_r) associated with one of the two rotational directions of the component.

11. The method according to claim 5, further comprising the step of assigning to the pulse height a predefined value (low, high) which is independent of the rotational speed and direction of the component.

12. The method according to claim 1, further comprising the step of varying at least one of the upper switching threshold (s_o) and the lower switching threshold (s_u) as a function of a distance (LS) between the sensor device (1) and of the component (2) sensed during the operation of the sensor device (1).

13. The method according to claim 1, further comprising the step of arranging the upper switching threshold (s_o) and the lower switching threshold (s_u) at least approximately symmetrically about a zero transition of the sensor signals of the sensor device.

14. The method according to claim 1, further comprising the step of amounting the phase shift of the sensor signals of the sensor device (1) during a rotation of the component (2) to at least approximately to p2.

15. A method for determining a rotational speed and a rotational direction of a component (2) via a sensor device (1), the method comprising the steps of:
generating a first sensor signal (I) as a function of a rotational speed and a second sensor signal (II) as a function of rotational direction of the component (2);
phase shifting the first and second sensor signals relative to one another;
triggering a switching signal in the sensor device (1) whenever the first and second sensor signals reach one of an upper switching threshold (s_o) or a lower switching threshold (s_u);
such that when there are alternating and consecutive switching signals of the first and second sensor signals (I, II), a pulse signal is generated as a function of consecutive first and second sensor signals (I, II) and used to determine a rotational speed of the component; and
generating only a pulse signal of the sensor device (1) when the component (2) reverses rotational direction and the rotational movement of the component (2) being sensed when a switching signal of one of the first and second sensor signals is consecutively followed by a switching signal of the other first and second sensor signals (II or I) which is then followed by a second switching signal of the one of the first and second sensor signals (I or II) which is then followed by a second switching signal of the other first and second sensor signals (II or I).

16. A method for determining a rotational speed and a rotational direction of a component (2) via a sensor device (1), the method comprising the steps of:
generating a first sensor signal (I) as a function of a rotational speed and a second sensor signal (II) as a function of rotational direction of the component (2);
phase shifting the first and second sensor signals relative to one another;
triggering a switching signal in the sensor device (1) whenever either of the first and second sensor signals reach one of an upper switching threshold (s_p) or a lower switching threshold (s_u) such that when alternating and consecutive switching signals of the first and second sensor signals (I, II) occur, generating a pulse signal as a function of the consecutive first and second sensor signals (I, II) and determining a rotational speed at the component from the generated pulse signals; and
only generating a pulse signal of the sensor device (1), following reversal of the rotational direction of the component (2), once rotation of the component (2) in the reversed rotational direction is recognized by a first switching signal of one of the first and second sensor signals (I or II) which is consecutively followed by a first switching signal or the other first and second sensor signals (II or I) which is then followed by a second switching signal of the one of the first and second sensor signals (I or II) which is then followed by a second switching signal of the other first and second sensor signals (II or I).

* * * * *